US011271792B2

United States Patent
Tseng et al.

(10) Patent No.: US 11,271,792 B2
(45) Date of Patent: Mar. 8, 2022

(54) USING A RECURSIVE PARSER TREE TO IMPLEMENT A SMALLER CODE SEGMENT FOR AN EMBEDDED SIMPLE NETWORK MANAGEMENT PROTOCOL AGENT

(71) Applicant: HEWLETT PACKARD ENTERPRISE DEVELOPMENT LP, Houston, TX (US)

(72) Inventors: Dennis Tseng, Taipei (TW); Min-Lin Lu, Taipei (TW); Jason Chuang, Taipei (TW); Yi-Ning Chen, Taipei (TW)

(73) Assignee: Hewlett Packard Enterprise Development LP, Houston, TX (US)

( * ) Notice: Subject to any disclaimer, the term of this patent is extended or adjusted under 35 U.S.C. 154(b) by 336 days.

(21) Appl. No.: 16/251,246

(22) Filed: Jan. 18, 2019

(65) Prior Publication Data
US 2020/0235981 A1 Jul. 23, 2020

(51) Int. Cl.
*G06F 15/173* (2006.01)
*H04L 41/0213* (2022.01)
*H04L 41/046* (2022.01)

(52) U.S. Cl.
CPC ........ *H04L 41/0213* (2013.01); *H04L 41/046* (2013.01)

(58) Field of Classification Search
CPC .......................... H04L 41/0213; H04L 41/046
USPC ....................................................... 709/223
See application file for complete search history.

(56) References Cited

U.S. PATENT DOCUMENTS

| | | | | | |
|---|---|---|---|---|---|
| 5,966,380 | A | * | 10/1999 | Przygienda | H04L 43/00 370/237 |
| 6,085,237 | A | * | 7/2000 | Durham | H04L 41/046 709/221 |
| 6,581,108 | B1 | * | 6/2003 | Denison | H04L 29/12009 709/223 |
| 6,704,792 | B1 | * | 3/2004 | Oswald | H04L 29/06 370/474 |
| 10,819,556 | B1 | * | 10/2020 | Rangasamy | H04L 41/0226 |

(Continued)

OTHER PUBLICATIONS

G, C. et al., "Optimization of Filtering Schemes for Broadband Astro-combs," (Research Paper), 2012, 2 pages, https://www.ncbi.nlm.nih.gov/pubmed/23187265.

(Continued)

*Primary Examiner* — Hee Soo Kim
(74) *Attorney, Agent, or Firm* — Nolte Lackenbach Siegel

(57) ABSTRACT

Systems and methods are provided for use in a Simple Network Management Protocol ("SNMP") computing environment, by which efficiency of computing systems employing SNMP may be improved. An SNMP message is parsed, and the parsed information used to construct a binary tree. By using a binary tree, which is a data object that consumes less memory resources, efficiency of interactions between elements of the SNMP computing environment are improved. A method can include receiving a SNMP request for data. Then, the SNMP request is parsed and a binary tree constructed from the parsed SNMP request. The binary tree includes a plurality of type-length-value nodes. The length value of each non-leaf node is the summation of the length values of all the child nodes below the non-leaf node; and the length value of each leaf node is the length of the data requested.

22 Claims, 5 Drawing Sheets

(56) References Cited

U.S. PATENT DOCUMENTS

| | | | | |
|---|---|---|---|---|
| 2003/0023605 | A1* | 1/2003 | Sternin | H04L 41/046 |
| 2006/0251075 | A1* | 11/2006 | Tams | H04L 47/10 |
| | | | | 370/392 |
| 2008/0133588 | A1* | 6/2008 | Kang | H04L 41/0233 |
| 2011/0134939 | A1* | 6/2011 | Zhang | H04L 69/06 |
| | | | | 370/474 |
| 2013/0182730 | A1 | 7/2013 | Fan et al. | |
| 2013/0346574 | A1* | 12/2013 | Singaraju | H04L 41/046 |
| | | | | 709/223 |
| 2018/0026830 | A1* | 1/2018 | Bhatia | H04L 41/0266 |
| | | | | 709/223 |

OTHER PUBLICATIONS

SnmpSharpNet, Mar. 8, 2009, 8 Pgs.

* cited by examiner

USING A RECURSIVE PARSER TREE TO IMPLEMENT A SMALLER CODE SEGMENT FOR AN EMBEDDED SIMPLE NETWORK MANAGEMENT PROTOCOL AGENT

BACKGROUND

Large computing systems frequently use "protocols" to define various aspects of their organization, communication, and operation. Some of these large computing systems are "networks". They include multiple computing apparatuses such as, for non-limiting examples, servers, routers, and switches, implementing certain types of architectures in certain topologies using certain protocols. Protocols are usually industry standards and are "rules" that define how the computing apparatuses of the network communicate and interact with one another. Protocols used in networks are frequently referred to as "network protocols", but network protocols are not necessarily limited to use in networks. There are other types of computing systems besides networks, and some of them use "network protocols" even though they technically are not networks.

One network protocol is known as "simple network management protocol", or "SNMP". SNMP is a set of protocols that define an automated management technique. Many computing systems have become sufficiently large and complex that automated tools are used to help manage the computing system and its resources. SNMP is one such tool. More precisely, SNMP is a set of protocols for use in network management and monitoring. Like many network protocols, it is not limited to use in networks per se and can be used in other kinds of computing systems that are not, technically, networks.

BRIEF DESCRIPTION OF THE DRAWINGS

Examples described herein may be understood by reference to the following description taken in conjunction with the accompanying drawings, in which like reference numerals identify like elements.

Figure 1:
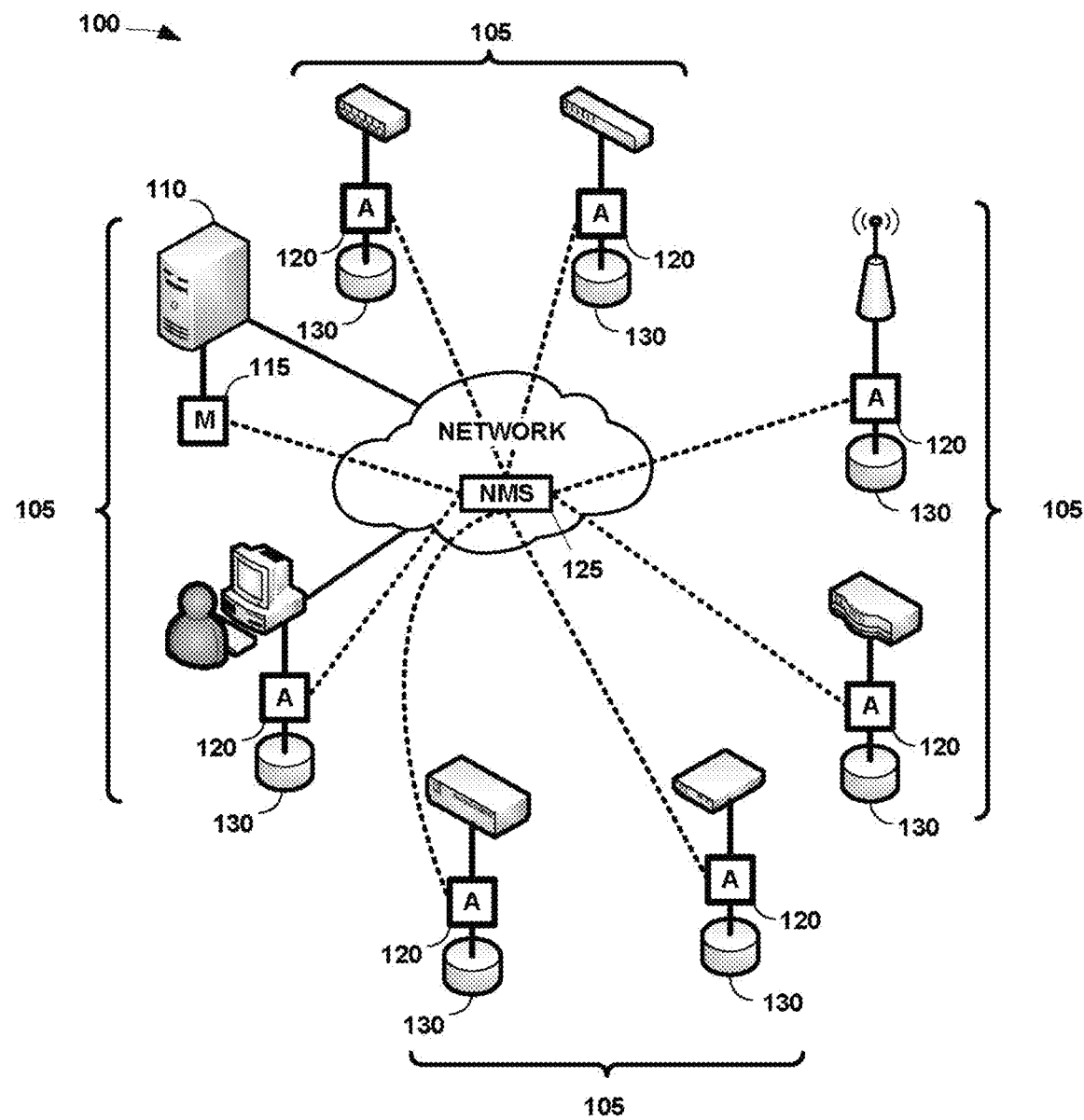
FIG. 1 conceptually illustrates a computing system in which the subject matter claimed below may be implemented in one example.

While examples described herein are susceptible to various modifications and alternative forms, the drawings illustrate specific examples herein described in detail by way of example. It should be understood, however, that the description herein of specific examples is not intended to be limiting to the particular forms disclosed, but on the contrary, the intention is to cover all modifications, equivalents, and alternatives falling within the spirit and scope of the examples described herein and the appended claims.

DETAILED DESCRIPTION

Illustrative examples of the subject matter claimed below will now be disclosed. In the interest of clarity, not all features of an actual implementation are described in this specification. It may be appreciated that in the development of any such actual example, numerous implementation-specific decisions may be made to achieve the developers' specific goals, such as compliance with system-related and business-related constraints, which will vary from one implementation to another. Moreover, it may be appreciated that such a development effort, even if complex and time-consuming, would be a routine undertaking for those of ordinary skill in the art having the benefit of this disclosure.

The present disclosure provides a technique by which the efficiency of computing systems employing SNMP may be improved. SNMP, as noted above, is a set of protocols for network management and monitoring of network devices responsive to their conditions of operation. These conditions are managed and monitored for proper, appropriate, and ongoing network administration. The SNMP protocols define an application layer protocol, a set of data objects, and a methodology for storing, manipulating and using data objects in a database schema. The presently disclosed technique modifies the methodology for manipulating and using data objects to improve the efficiency of the interaction between elements of the SNMP computing environment.

One consideration in an SNMP computing environment is the allocation of memory for use in meeting SNMP requests in messaging. Certain messages as described below include headers and bodies. In known practice, the SNMP message is parsed and the parsed information used to construct a linked list. Each entry in the linked list is a time-length-value ("TLV") record. A large fixed size array or hash data structure is then used to search the accompanying management information base ("MIB"). The large size of this tool unnecessarily consumes memory resources.

More particularly, in an SNMP computing environment, an SNMP "manager" will query SNMP "agents" for information by sending them a message. Most of the time, in known practice, the message headers for received messages are discarded after parsing them from the message body and the SNMP Agent creates a linked-list data structure to record each consequential request TLV. In this linked-list, there is no relationship between each of the TLV records in the list other than their relative positioning in the list. Such a structure will result in sequential execution when responding to the SNMP Manager, and thus enlarge the code size when encoding the SNMP response message.

In the examples disclosed herein, the SNMP Agent builds a binary Abstract Notation Syntax 1 ("ASN.1") tree instead of a linked-list when parsing incoming SNMP messages. The ASN.1 tree can then be used to encode all kinds of SNMP response messages later by using a recursive algorithm, for example, an INFIX search tree algorithm. Each node in the tree has three fields for time ("T"), length ("L") and value ("V") respectively, where V may be a memory pointer to a child node.

Still more particularly, two factors strongly influencing code segment size for each SNMP Agent are message processing and management information base ("MIB") size. The examples provided herein employ a SNMP recursive tree, named ASN.1 Parser Tree, to deal with the first factor to reduce the code segment size, and thus resolve the memory limitation issue in some specific purpose embedded systems. The recursive algorithm can downsize the code segment although it might slow the execution time to $O(N^2)$ sometimes. But, unlike data-plane protocols where execution time might be more a stronger consideration, SNMP is a management plane protocol in which the execution time is less of an issue.

The SNMP recursive tree is a binary tree constructed from the parsed information. Each node is a TLV node and includes four entries: a type, a length, value that is a pointer to a child node or a memory location, a value that is a pointer to a left sibling node. (The pointers may be "nulls" where appropriate.) The length entry is the summation of the length values for all the child nodes below that TLV node. Thus, when traversing the tree to formulate the SNMP response, the SNMP Agent can easily calculate the total length for each parent node. And because of the characteristics of recursive algorithm applied in this binary tree, the code memory can be conserved.

Turning now to the drawings, and referring specifically to FIG. 1, a computing system 100 is conceptually illustrated. The computing system 100 is a network in this particular example. The computing system 100 may employ any type of networking topology known to the art, such as, without limitation, a bus, star, ring, or other topology. The computing system 100 may employ any type of networking architecture such as a peer-to-peer or client/server architecture, again without limitation. Similarly, any suitable networking protocol may be employed, including SNMP. However, the subject matter claimed below is not limited to networks and may be used in any suitable computing system known in the art using SNMP.

The computing system 100 includes a plurality of network devices 105. Those in the art having the benefit of this disclosure will appreciate that a networked computing system may be more complex than what is shown. These details are routine and conventional and so they are not shown so as not to obscure that which is claimed below. The network devices 105 may include any type of network device known to the art such as, without limitation, routers, hubs, bridges, switches, servers, workstations, printers, modem racks, and other network components and devices. One of the network devices 105, a server 110, hosts a SNMP Manager 115 while the remaining network devices 105 host SNMP Agents 120. While it is possible in some examples to have more than one SNMP Manager 115, each SNMP Agent 120 only reports to one SNMP Manager 115 at a time. On each network device 105 in which resides a SNMP Agent 120 also resides a management information base ("MIB") 130 and a binary tree ("BT") 135, both created and maintained by the SNMP Agent 120 as discussed further below.

The SNMP Manager 115 ("M") and SNMP Agents ("A") 120 are a portion of a network management system ("NMS") 125. A NMS typically is an application or a set of applications that network administrators use to manage a network, its traffic, and its network devices. More specifically, a NMS can be used to monitor network devices and their performance, analyze the performance of network devices, and to manage network devices. In the illustrated example, the SNMP Manager 115 and the SNMP Agents 120 are parts of the NMS 125 (as indicated by the ghosted lines).

The SNMP Manager 115 and SNMP Agents 120 are distributed across the computing system 100 as shown and are used by the NMS 125 to monitor, analyze, and manage the performance of the network devices 105.

Each of the network devices 105 is a processor-based device. Depending on the computing demands of the functionality performed by the network device 105, the processor may be a CPU, a processor set, or a controller. The particular implementation for the processor will therefore be role-specific. The network device 105 will also have a memory whose make-up will be role-specific. For example, a server may provide storage for the computing system 100 and so include some kind of mass storage Including numerous arrays of hard disks or solid state drives. A switch, on the other hand, does not need that kind of capacity to perform its role and so may have a relatively smaller amount of read-only memory ("ROM") and random-access memory ("RAM").

Figure 2:
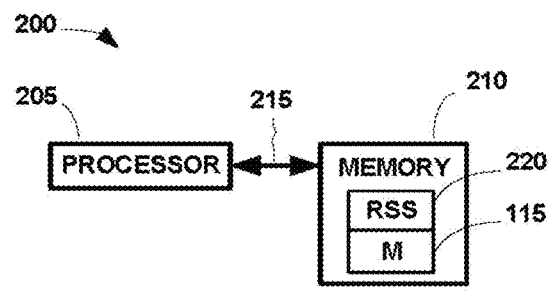
FIG. 2-FIG. 3 depict selected portions of the hardware and software architectures of two network devices of the computing system of FIG. 1, one hosting a SNMP Manager and one hosting a SNMP Agent.
Figure 3:
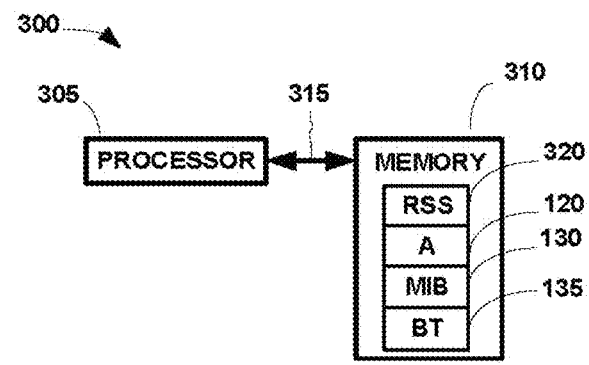

FIG. 2 and FIG. 3 illustrate selected aspects of the hardware and software architecture of a network device 200 hosting a SNMP Manager ("M") 115 and a network device 300 hosting a SNMP Agent 120. Referring to FIG. 2, the network device 200 includes a processor 205 and a memory 210 communicating over a bus system 215. On the memory 210 resides some role specific software ("RSS") 220 that the processor 205 executes over the bus system 215 to implement the functionality of the role of the network device 200 within the computing system 100. The SNMP Manager 115 also resides on the memory 210. Referring now to FIG. 3, the network device 300 includes a processor 305 and a memory 310 communicating over a bus system 315. On the memory 310 resides some role specific software 320 that the processor 305 executes over the bus system 315 to implement the functionality of the role of the network device 300 within the computing system 100. A SNMP Agent 120 also resides on the memory 310, along with a management information base ("MIB") 130 and a binary tree ("BT") 135.

The SNMP Manager 115 and the SNMP Agent 120 are also each executed by the respective processors 205, 305 over the respective bus systems 215, 315. As a part of the NMS 125 (shown in FIG. 1), they are applications in the illustrated example. However, they typically run in the background of the operations performed by the network devices 200, 300. They therefore may alternatively be implemented as daemons and still other types of software may be used in other examples. In general, they will be implemented and executed as SNMP Managers and SNMP Agents are currently implemented conventional practice.

Figure 4:
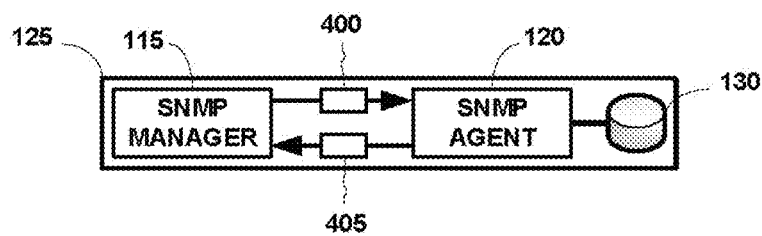
FIG. 4 conceptually illustrates messaging between the SNMP Manager and SNMP Agent of FIG. 2-FIG. 3 in accordance with SNMP protocols.

Referring now to FIG. 4, a SNMP Manager 115 and a SNMP Agent 120 are shown to demonstrate interactions that more generally occur between the SNMP Manager 115 and each of the SNMP Agents 120. The SNMP Manager 115 collects and organizes information from the SNMP Agents 120. The SNMP Agents 120 collect data regarding the operation of their respective network device 105, convert the data into variables and organize the variables into hierarchies and store in the management information base 130, which is a virtual database.

The SNMP Manager 115 and the SNMP Agent 120 communicate with each other using what are called "protocol data units" ("PDU"). Among these protocol data units are Get Request, SetRequest, GetNextRequest, GetBulkRequest, Response, Trap, and InformRequest. Some protocol data units 400, shown in FIG. 4, such as GetRequest, for example, may request specific data from the SNMP Agent 120 in the form of variables from the hierarchical databases, or management information bases 130. The SNMP Agent 120 will then formulate and transmit to the SNMP Manager 115 a Response 405 containing the requested information. More particularly, GetRequest is a request from the SNMP Manager 115 to the SNMP Agent 120 to retrieve the value of a variable or, perhaps, a list of variables. The SNMP Agent 120 receives the request, parses the request, and retrieves the value(s) from the management information base 130. The retrieved value is then used to formulate a Response 405 that the SNMP Agent 120 then transmits to the SNMP Manager 115.

More particularly, SetRequest Is a request from the SNMP Manager 115 to the SNMP Agent 120 to change the value of one or more variables. The new values are specified in a portion of the request called the "variable bindings". A "variable binding" is a pairing between an SNMP object instance name with its associated value. So the SetRequest asks for the value of a variable that identifies an object in the SNMP computing environment. The SNMP Agent 120 receives the request, parses the request, and then changes the values of the variables. The SNMP Agent 120 then formulates a Response including the new values of the variables and transmits the Response to the SNMP Manager 115.

GetNextRequest is a request from the SNMP Manager 115 to the SNMP Agent 120 to discover the variables that are available and their values. One use for GetNextRequest is to "walk", or completely traverse, the management information base 310 of the SNMP Agent 120 through iterative GetNextRequests requests. The SNMP Agent 120 formulates a Response with the variable binding for the lexicographically next variable in the management information base 310.

GetBulkRequest is a request from the SNMP Manager 115 to the SNMP Agent 120 includes multiple iterations of the GetNextRequest. The SNMP Agent 120 formulates a Response that includes multiple variable bindings walked from the variable binding or bindings in the request.

Response is a communication from an SNMP Agent 120 to the SNMP Manager 115 responsive to GetRequest, SetRequest, GetNextRequest, GetBulkRequest, and InformRequest to provide the variable bindings specified in one or more of those requests. The Response can also report errors.

Other protocol data units such as Trap and InformRequest may also be found in the SNMP computing environment. There may still be other protocol data units in various SNMP versions, as SNMP continues to evolve, or in SNMP-based computing environments that supplement what SNMP implements. The presently disclosed technique can be used with any SNMP protocol data unit that responds with information to a SNMP protocol data unit requesting information.

Figure 5:
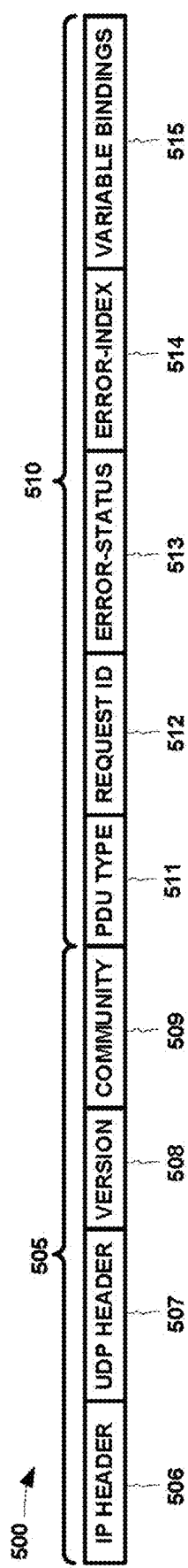
FIG. 5 illustrates the structure of an example SNMP protocol data unit.

SNMP defines the form and content of the protocol data units. FIG. 5 illustrates the general form of a protocol data unit 500 in a SNMP computing environment. Note that this is a general form and some protocol data units vary from the general form. For example, GetBulkRequest includes non-repeater and max-repetition fields in addition to those shown in FIG. 5. The protocol data unit 500 generally includes a message header 505 and a message body 510. Each of the message header 505 and the message body 510 include one or more "fields" as defined by SNMP.

More particularly, the message header 505 includes an Internet Protocol ("IP") header field 506, an user datagram protocol ("UDP") header field 507, a version field 508, and a community field 509. The IP header field 506 is the header required by the IP protocol and the UDP header field 507 is the header required by the UDP protocol. The version field 508 indicates what version of SNMP is being used. The community field 509 defines the access environment for network management systems. The message body 510 include a PDU-type field 511, a request-identifier ("ID") field 512, an error-status field 513, an error-index field 514, and a variable bindings field 515. The PDU-type field 511 specifies the type of PDU transmitted. The request identifier field 512 associates SNMP requests with responses. The error-status field 513 associates an error with a particular object instance and is set to 0 unless a Response is indicating an error, in which case it is set to 1. The variable bindings field 515 is the data field each variable binding associates a particular object instance with its current value. (There are exceptions for the Get and GetNext requests, each of which ignores the value).

Referring now collectively to FIG. 4 and FIG. 5, in operation, the SNMP Manager 115 performs its role within the NMS 125 by periodically sending requests 400 to the various SNMP Agents 120 for data. These requests may be, for example, a GetRequest, SetRequest, GetNextRequest, or GetBulkRequest, requesting data. The SNMP Agent 120, upon receiving the request and realizing it should respond, then begins the process for formulating the response.

The SNMP Agent 120 begins by parsing the SNMP request 400. In the illustrated example, the SNMP Agent 120 parses the SNMP request 400 by the various fields in the SNMP Request 400. So, if the SNMP request 400 follows the format of the protocol data unit 500 in FIG. 5, the SNMP Agent 400 will parse it into the IP header 506, the UDP header 507, the version 508, the community 509, the PDU type 511, the request ID 512, the error-status 513, the error-status 513, and the variable bindings 515.

The SNMP Agent 120 then constructs a binary tree from the parsed SNMP request 400. In the illustrated example, the binary tree is an ASN.1 tree. "ASN.1" is an acronym for "Abstract Syntax Notation 1". ASN.1 is an "interface definition language", which is a language that makes interfacing two software components who do not share a common language in a language independent manner across platforms. Thus, the illustrated example defines the binary tree in a language independent way.

Figure 6:
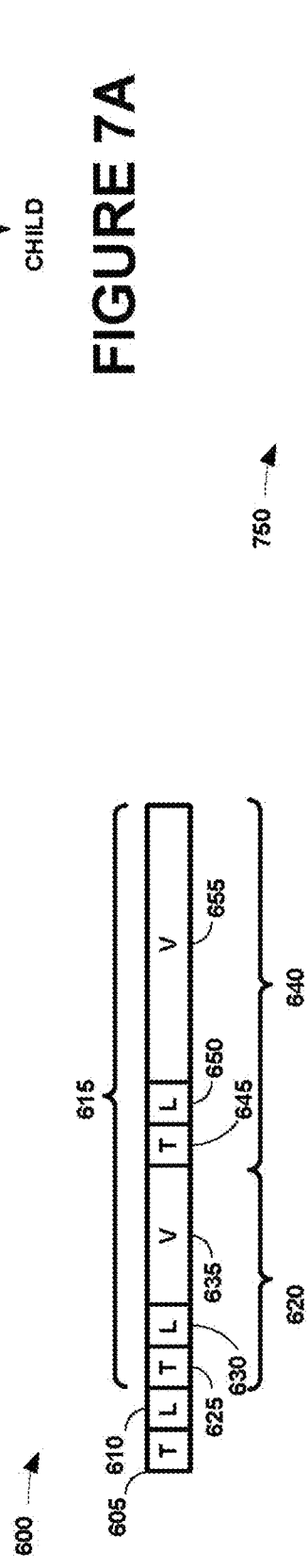
FIG. 6 illustrates a tag-length-value construct under basic encode rules.

One feature of the ASN.1 is what are known as "basic encode rules", or "BER". Values from any abstract syntax defined using ASN.1 can be encoded with BER. BER uses tag, length, value ("TLV") encoding. The "tag" is an "identifier", the length is the length of the content, and the value is the "contents" of the TLV. Each value, however, may itself be made up on one of more TLV-encoded values. This is illustrated in FIG. 6, in which a TLV construct 600 includes a tag 605, a length 610, and a value 615. The value 615 includes two further TLV constructs, a TLV construct 620, including a tag 625, a length 630, and a value 635, and a TLV construct 640, including a tag 645, a length 650, and a value 655.

The SNMP Agent 120 uses the BER to construct the binary tree from the SNMP request 400. The binary tree is a tree structure in which each node has no more than two child nodes. Thus, each node has no more than two pointers. Each leaf node stores an object value, the 'Value' of TLV, or a pointer points to the next lower level of tree. Each non-leaf node is mainly used to store 'Type', 'Length' and a pointer points to next level of tree. Each ASN.1 object defined in SNMP message can be represented in TLV format.

The relationship between parent and child nodes is as defined in SNMP Request for Comments ("RFC") specification in which the SNMP message structure is depicted. Each value 'V' of a SNMP message object could be composed of several sub-objects. As discussed below. The relationship between sibling nodes is defined in SNMP RFC specification in which the SNMP message structure is depicted. Sub-objects belonging to an identical parent node can be used to describe more details about their parent.

Each of the nodes in the binary tree comprises a plurality of type-length-value nodes. The length and value for any given node will depend upon whether the node Is a "non-leaf" node within the tree or a "leaf" node. In non-leaf nodes, the value will be a pointer to a child node elsewhere in the binary tree. In leaf nodes, the value will be a pointer to a location in memory outside the binary tree. The length value will also depend on whether the node is a non-leaf node or a leaf node. In a non-leaf node, the length is the summation of the length values of all the child nodes below it. In a leaf node, the length is the length of the data requested. Each TLV node also includes a pointer to a sibling node. If there is no sibling node this pointer is a "null".

Figure 7A:
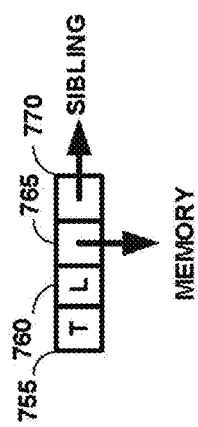
FIG. 7A and FIG. 7B illustrate the structure of a non-leaf node and a leaf node, respectively, in a binary tree.

FIG. 7A illustrates a TLV non-leaf node 700. The non-leaf node 700 includes a tag 705, a length 710, a value that is a child pointer 715, and a sibling pointer 720. As discussed above, the child pointer 715 points to a child node (not shown) and the sibling pointer 720 points to a sibling node (also not shown) if there is one. If there is no sibling node, the sibling pointer 720 is a null. The length 710 will be a summation of the length values of all the child nodes below the non-leaf node 700.

Figure 7B:
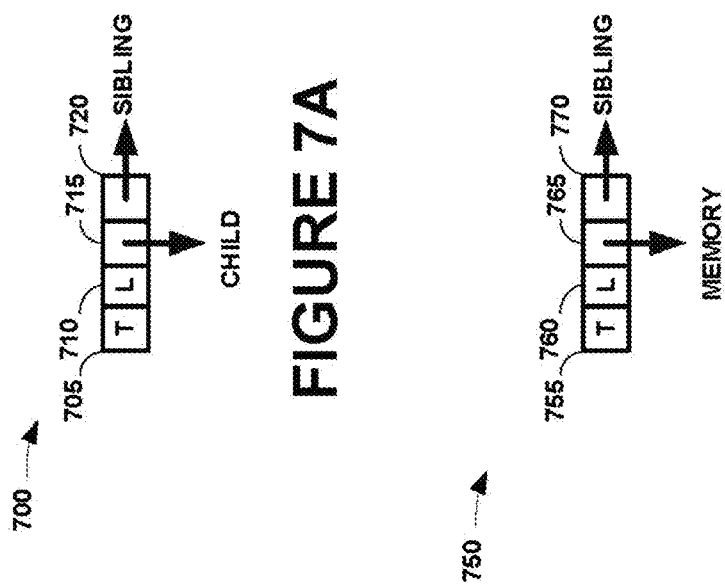

FIG. 7B illustrates a TLV leaf node 750. The leaf node 750 includes a tag 755, a length 760, a memory pointer 765, and a sibling pointer 770. The memory pointer 765 points to some part of memory (not shown) where some information is stored outside of the binary tree and the sibling pointer 770 points to a sibling node (also not shown) if there is one. If there is no sibling node, the sibling pointer 770 is a null.

Figure 8A:
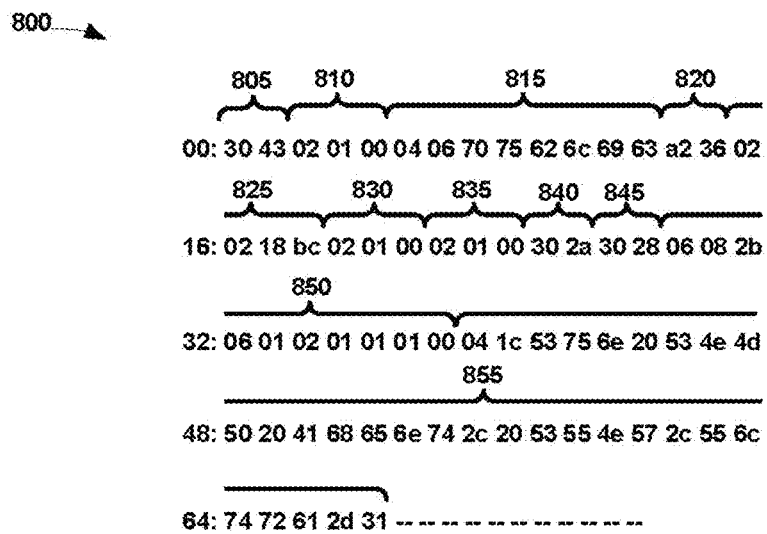
FIG. 8A and FIG. 8B illustrate how an SNMP Agent parses an actual SNMP Request message to build a binary tree for formulating a response in accordance with some examples.
Figure 8B:
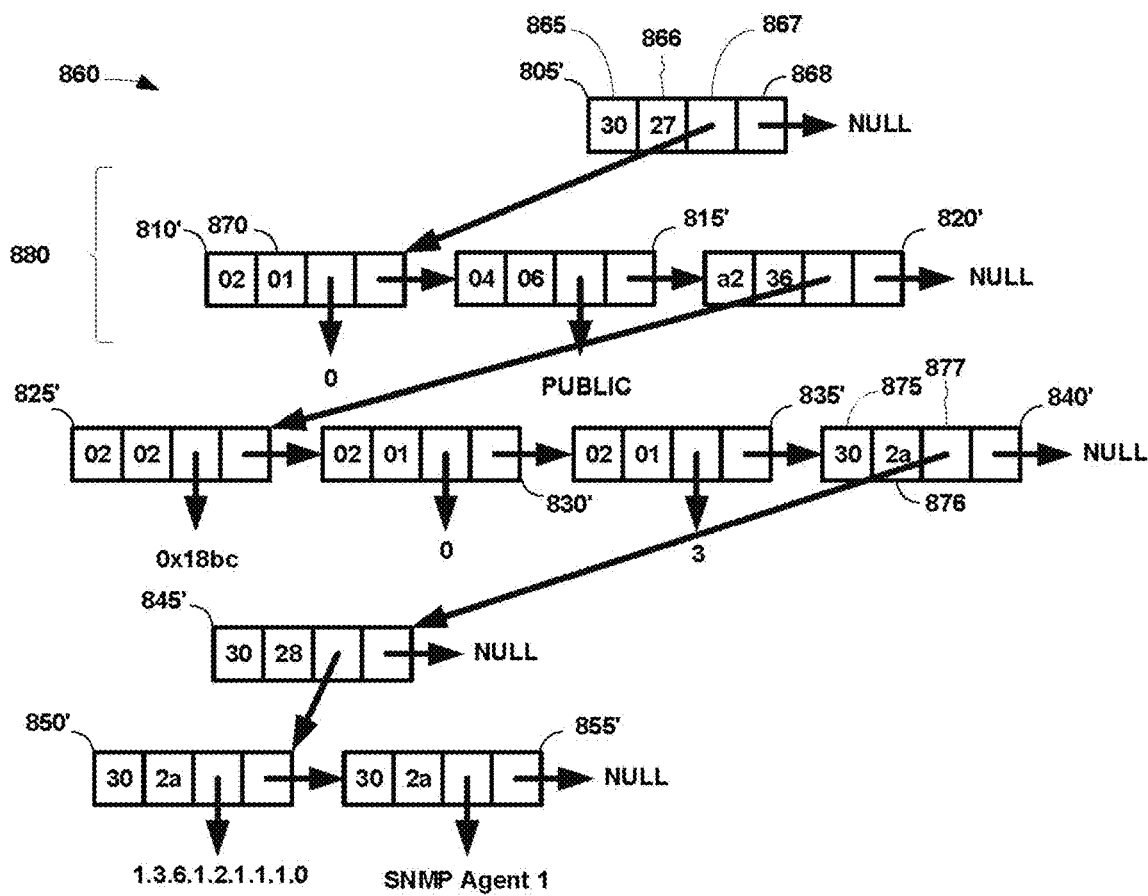

For purposes of illustration, Table 1 and FIG. 8A-FIG. 8B illustrate one particular message 800 that is a GetResponse request and how an SNMP Agent 120 might parse it to build a binary tree in accordance with some examples. The message 800 is a 69-byte GetResponse request and is presented in FIG. 8A in five lines. Each line is indexed in the left-hand column by the number of the leading byte for that line within the 69-byte message. Thus, the first line begins with byte 0, the second line with byte 16, the third line byte 32, the fourth line with byte 48, and the fifth line with byte 65. Those in the art having the benefit of this disclosure will appreciate, however, that the message 800 will be received by the SNMP Agent 120 in a set of 69 bytes without the indexes. The value of each byte is expressed in hexadecimal.

field 830, the error-index field 835 that are then parsed out. The variable bindings begin at byte 25 and include the fields 840, 845, 850, and 855 as described in Table 1.

The SNMP Agent 120 then creates the binary tree 860 shown in FIG. 8B. The nodes have similar numbers to the fields from which they are created. So, for example, the root node 805' is created from the header field 805 of the message 800 in FIG. 8A. The identifier of the tag 865 is the first byte (byte 0) of the header field 805, the value of the length 866 is the sum of the lengths of all the child nodes below it, which are all the other nodes in the tree 860. The value 867 is a pointer to the child node 810' and the sibling pointer 868 is a null as the root node 805' does not have a sibling node.

The node 810' is a child of the root node 805', but is a leaf node—that is, it does not point to another node in the binary tree 860. The node 810' corresponds to the version field 810 of the message 800. The length 870 is the length of the information to which it points (i.e., the version number), which is a single byte. A similar analysis applies to the other leaf nodes 815', 825', 830', 835', 850', and 855'. The non-leaf nodes 820', 840', 845' follow an analysis similar to that of the root node 805'. Take for example, the non-leaf node 840'. The tag 875 is the first byte of the field 840, the length 876 is the sum of all the child nodes below it, and the value 877 is a pointer to the child node 845'.

Still referring to FIG. 8B, in this particular example, the root node 805' has three fields which are 0x30 (Type), 0x49 (Length) and a pointer points to next lower leaf 810' of the binary tree 860. (The 4th field is also a pointer but points to a NULL sibling.) The second level 880 of the binary tree 860 has three nodes 810', 815', and 820', and each node 810', 815', and 820' also has TLV which stands for Type, Length and Value. For instance, the second node 815' of this second level 880 of the binary tree 860 has 0x04 (Type), 0x06 (Length), a value pointer points to 'public' and finally a fourth field points to the sibling (i.e., the node 820') of the same level 880 of the binary tree 860. Thus, the third field of each node could point to a Value memory or point to the next lower level of tree if it is the rightmost node of this level.

Figure 9:
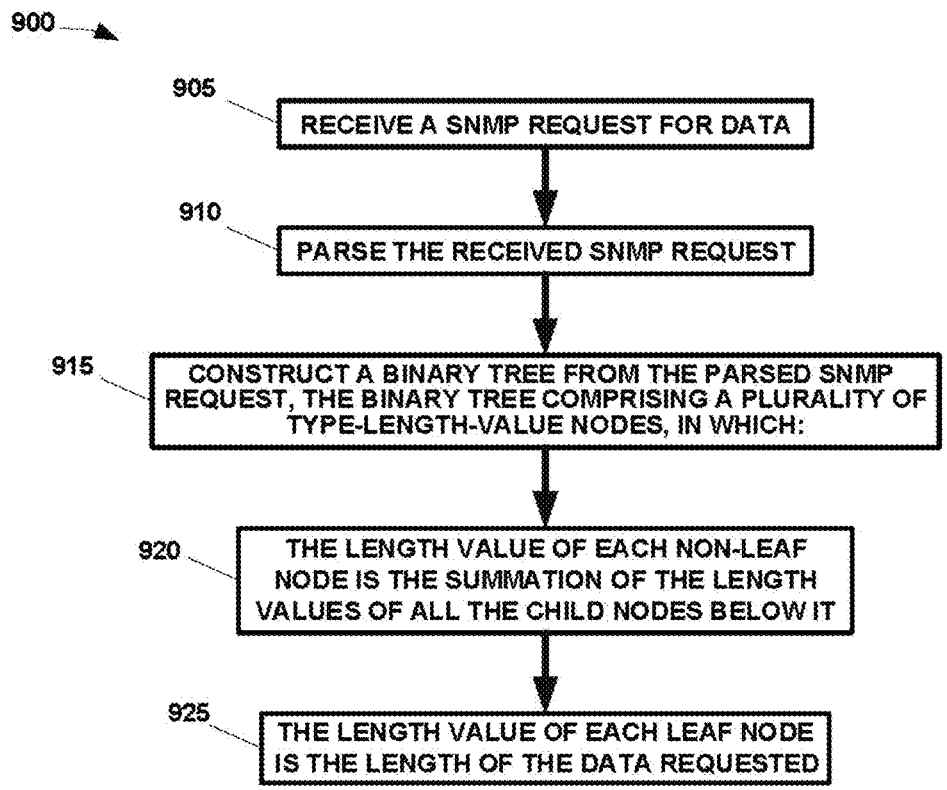
FIG. 9 depicts one example of a method for use in a SNMP computing environment for building a data structure with which a SNMP response may be formulated.

FIG. 9 depicts one example of a method 900 for use in a SNMP computing environment for building a data structure with which a SNMP response may be formulated. The method 900 begins with receiving (at 905) a SNMP request for data, such as the request 800 in FIG. 8A. In general, the SNMP Agent 120 receives such a request from the SNMP Manager 115 as shown in FIG. 4 and described above. The method 900 then continues by parsing (at 910) the received SNMP request, in the manner described above relative to the example of FIG. 8A, although the claimed subject matter is not so limited, as performed by the SNMP Agent 120.

TABLE 1

| | | Explanation of Message Content |
|---|---|---|
| HEADER | 00: | SNMP MESSAGE (0X30): 67 BYTES |
| | 02: | INTEGER VERSION (0X2) 1 BYTE: 0 (SNMPV1) |
| | 05: | OCTET-STR COMMUNITY (0x4) 6 BYTES: PUBLIC |
| BODY | 13: | RESPONSE-PDU (0Xa2) 54 BYTES |
| | 15: | INTEGER REQUEST-ID (0x2) 2 BYTES: 6332 |
| | 19: | INTEGER ERROR-STATUS (0x2) 1 BYTE: 0 |
| | 22: | INETEGER ERROR-INDEX (0x2) 1 BYTE noERROR (0) |
| | 25: | SEQUENCE VARBIND-LIST (0x30): 40 BYTES |
| | 27: | SEQUENCE VARBIND (0x30): 40 BYTES |
| | 29: | OBJ-id (0X6) 8 BYTES: .1.3.6.1.2.1.1.1.0 |
| | 39: | OCTECT-STE (0x4) 28 BYTES: "SNMP Agent 1" |

The SNMP Agent 120 parses the message 800 into its separate fields. So, the header field 805, the version field 810, and the community field 815, which form the header of the message 800, are parsed out. The body includes the PDU-type field 820, the request ID field 825, the error-status Once the SNMP request is received (at 905) and parsed (at 910), the method 900 then constructs (at 915) a binary tree from the passed SNMP request. One example was discussed above in the construction of the binary tree 860 in FIG. 8B from the parsed SNMP request 800 of FIG. 8A. In the binary tree, the length value of each non-leaf node is (at 920) the summation of the length values of all the child nodes below it and the length value of each leaf node is (at 925) the length of the data requested.

As mentioned above, the ASN.1 tree can be used to encode all kinds of SNMP response messages using a recursive algorithm, for example, an INFIX search tree algorithm. The recursive algorithm can downsize the code segment although it might slowdown the execution time to $O(N^2)$ sometimes. And because the characteristics of recursive algorithm applied in this binary tree, the code memory can be conserved. Table 2 presents a pseudo-code example of one such recursive algorithm to build a response.

TABLE 2

Pseudo-code Recursive Algorithm for Response Building

```
/*-----------------------------------------------------------------------------------------------------
* ASM_SNMP_MESSAGE( )
*
* @PURPOSE :
* - used to assemble outgoing message inversely from msg tree.
* - The L field = length of L + length of V = none asn. 1
* The L field of SEQUENCE node =
* the L field of the child of current node +
* the summation of L fields of all brothers of
* the child of current node.
* The V field of each node will keep L, V field asn. 1 type of each object.
* @INPUT :
* msg_tree – the start node of MSG tree to be printed out
* msg_ptr – pointers to a block memory used to store new
* message.
* @OUTPUT :
* msg_tree – same as input except that each L field of all nodes are correct.
* @RETURN : msg_ptr or do the best effort if output msg length is too long.
* NOTE :
* 10  For the final node, msg_tree->len=10
* / \
* / \
* / \
* 3 7  For each immediate node, msg_tree->len=3 or 7
* / \ / \
* / \ / \
* 1 2 3 4  For leaf, tot_len=sum of each node=1+2+3+4=10
*
*-----------------------------------------------------------------------------------------------------*/
U8 *ASM_SNMP_MESSAGE(SNMP_MSG msg_tree, U8 *msg_ptr, U16 tot_len)
{
SNMP_MSG msg_node;
if (msg_tree == NULL) return msg_ptr;
if (msg_tree->brother) {
msg_ptr = ASM_SNMP_MESSAGE(msg_tree->brother, msg_ptr, tot_len);
if (msg_ptr == NULL) return NULL;
}
if ((msg_tree->type & Constructed) && msg_tree->vp) {
msg_ptr=ASM_SNMP_MESSAGE((SNMP_MSG)msg_tree->vp, msg_ptr, tot_len);
if (msg_ptr == NULL) return NULL;
}
}
```

Table 3 presents a pseudo-code example of an algorithm that can be used to debug.

TABLE 3

Algorithm for Debugging

```
void PRINT_SNMP_MSQ_TREE(node, tab_cnt)
{
if (node == NULL) return;
for(j=0; i<tab_cnt; i++) printf(" ");
PRINT_SNMP_MSG_NODE(node);
if ((SNMP_MSG)node->vp && (node->type & Constructed))
PRINT_SNMP_MSG_TREE((SNMP_MSG)node->vp, tab_cnt+1):
```

Figure 10:
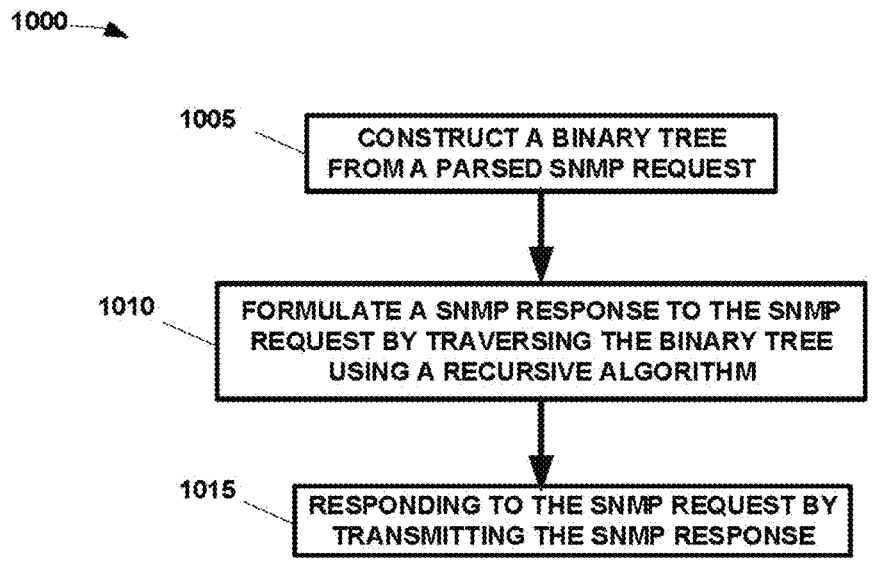
FIG. 10 depicts one example of a method for use in a SNMP computing environment in another example.

Thus, in accordance with another example, a method 1000, illustrated in FIG. 10, is for use in a Simple Network Management Protocol ("SNMP") computing environment. The method 1000 begins by constructing (at 1005) a binary tree from a parsed SNMP request. Next, a SNMP response to the SNMP request is then formulated (at 1010) by traversing the binary tree using a recursive algorithm. And then, the method continues by responding (at 1015) to the SNMP request by transmitting the SNMP response.

SNMP is referred to herein in a general fashion to refer to all versions of SNMP. Those in the art will appreciate that SNMP is available in three different versions, SNMPv1, SNMPv2, and SNMPv3. Some of the difference among these versions may impact specific implementations of the subject matter claimed below. For example, the GetBulkRequest and InformRequest were introduced in SNMPv2 and therefore are not found in SNMPv1. For another example, the Response protocol data unit in SNMPv2 and SNMPv1 is called GetResponse in SNMPv1. The technique disclosed herein may nevertheless be used with any of these versions with appropriate accommodation for the differences.

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "accessing", "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the technique disclosed herein are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The technique is not limited by these aspects of any given implementation.

This concludes the detailed description. The particular examples disclosed above are illustrative only, as examples described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular examples disclosed above may be altered or modified and all such variations are considered within the scope and spirit of the appended claims. Accordingly, the protection sought herein is as set forth in the claims below.

What is claimed is:

1. A method for use in a Simple Network Management Protocol ("SNMP") computing environment, comprising:
   receiving a SNMP request for data;
   parsing the received SNMP request;
   constructing a binary tree from the parsed SNMP request, the binary tree comprising a plurality of type-length-value nodes, in which:
      the length value of each non-leaf node is the summation of the length values of all the child nodes below the non-leaf node; and
      the length value of each leaf node is the length of the data requested;
   formulating a SNMP response to the SNMP request by traversing the binary tree using a recursive algorithm; and
   responding to the SNMP request by transmitting the SNMP response.

2. The method of claim 1, wherein the SNMP request is a GetRequest, a SetRequest, a GetNextRequest, or a GetBulkRequest.

3. The method of claim 1, wherein parsing the received SNMP request includes parsing the received SNMP request by field.

4. The method of claim 3, wherein parsing the receive SNMP request by field includes parsing the SNMP request body by field.

5. The method of claim 1, wherein constructing the binary tree includes constructing a binary Abstract Syntax Notation 1 binary tree.

6. The method of claim 1, wherein formulating the SNMP response comprises encoding the SNMP response using the recursive algorithm.

7. The method of claim 6, wherein encoding the SNMP response includes each node in the tree binary tree including a time field ("T"), a length field ("L") and a value field ("V") encoded in the SNMP response.

8. The method of claim 7, wherein the recursive algorithm is an INFIX algorithm.

9. A Simple Network Management Protocol ("SNMP") computing environment, comprising:
 a plurality of network devices;
 a SNMP Manager hosted on a first one of the network devices;
 a SNMP Agent hosted on a second one of the network devices that, in operation receives requests for information from the SNMP Manager and formulates a response to the requests, including:
  parsing the received SNMP request; and
  constructing a binary tree from the parsed SNMP request, the binary tree comprising a plurality of type-length-value nodes, in which:
   the length value of each non-leaf node is the summation of the length values of all the child nodes below the non-leaf;
   the length value of each leaf node is the length of the data requested;
  formulating a SNMP response to the SNMP request by traversing the binary tree using a recursive algorithm; and
  responding to the SNMP request by transmitting the SNMP response.

10. The SNMP computing environment of claim 9, wherein the SNMP request is a GetRequest, a SetRequest, a GetNextRequest, or a GetBulkRequest.

11. The SNMP computing environment of claim 9, wherein parsing the received SNMP request includes parsing the received SNMP request by field.

12. The SNMP computing environment of claim 11, wherein parsing the receive SNMP request by field includes parsing the SNMP request header by field.

13. The SNMP computing environment of claim 9, wherein constructing the binary tree includes constructing a binary Abstract Syntax Notation 1 binary tree.

14. The SNMP computing environment of claim 9, wherein formulating the SNMP response comprises encoding the SNMP response using the recursive algorithm.

15. The SNMP computing environment of claim 14, wherein encoding the SNMP response includes each node in the tree binary tree including a time field ("T"), a length field ("L") and a value field ("V") encoded in the SNMP response.

16. The SNMP computing environment of claim 15, wherein the recursive algorithm is an INFIX algorithm.

17. A computer-readable, non-transitory storage medium encoded with instructions that, when executed by a processor, cause the processor to:
 receive a Simple Network Management Protocol ("SNMP") request for data;
 parse the received SNMP request;
 construct a binary tree from the parsed SNMP request, the binary tree comprising a plurality of type-length-value nodes, in which:
  the length value of each non-leaf node is the summation of the length values of all the child nodes below the non-leaf node; and
  the length value of each leaf node is the length of the data requested;
 formulate a SNMP response to the SNMP request by traversing the binary tree using a recursive algorithm; and
 respond to the SNMP request by transmitting the SNMP response.

18. The computer-readable, non-transitory storage medium of claim 17, wherein parsing the received SNMP request includes parsing the received SNMP request by field.

19. The computer-readable, non-transitory storage medium of claim 17, wherein constructing the binary tree includes constructing a binary Abstract Syntax Notation 1 binary tree.

20. The computer-readable, non-transitory storage medium of claim 17, wherein formulating the SNMP response includes encoding the SNMP response using the recursive algorithm such that each node in the tree has a time field ("T"), a length field ("L") and a value field ("V") encoded in the SNMP response.

21. A method for use in a Simple Network Management Protocol ("SNMP") computing environment, comprising:
 constructing a binary tree from a parsed SNMP request, wherein the binary tree comprises a plurality of type-length-value nodes, in which:
  the length value of each non-leaf node is the summation of the length values of all the child nodes below beneath the non-leaf node; and
  the length value of each leaf node is the length of the data requested;
 formulating a SNMP response to the SNMP request by traversing the binary tree using a recursive algorithm, wherein formulating the SNMP response comprises encoding the SNMP response using the recursive algorithm such that each node in the tree has a time field ("T"), a length field ("L") and a value field ("V") encoded in the SNMP response; and
 responding to the SNMP request by transmitting the SNMP response.

22. The method of claim 21, further comprising:
 receiving the SNMP request; and
 parsing the SNMP request.

* * * * *